(12) United States Patent
Lan

(10) Patent No.: US 6,793,292 B2
(45) Date of Patent: Sep. 21, 2004

(54) SEAT DEVICE FOR A STROLLER

(76) Inventor: Red Lan, 15F, No. 108, Sec. 1, Hsin Tai 5th Rd., Hsichih, Taipei Hsien (TW)

( * ) Notice: Subject to any disclaimer, the term of this patent is extended or adjusted under 35 U.S.C. 154(b) by 0 days.

(21) Appl. No.: 10/222,385

(22) Filed: Aug. 16, 2002

(65) Prior Publication Data
US 2003/0098604 A1 May 29, 2003

(30) Foreign Application Priority Data
Sep. 25, 2001 (GB) .............................................. 0123005

(51) Int. Cl.⁷ .............................................. A47C 31/00
(52) U.S. Cl. ............... 297/487; 297/250.1; 297/256.15; 297/485; 297/488; 280/47.38; 280/642
(58) Field of Search .............................. 297/487, 250.1, 297/256.15, 485, 463.1, 488; 403/322.4, 109.3, 292, 330, 24; 280/47.38, 642, 644, 650, 658

(56) References Cited

U.S. PATENT DOCUMENTS 5,004,253 A * 4/1991 Nakao et al.
5,123,767 A * 6/1992 Ishikura et al.
5,244,228 A * 9/1993 Chiu
5,549,311 A * 8/1996 Huang
6,267,404 B1 * 7/2001 Yang et al.
6,447,001 B1 * 9/2002 Hsia
6,523,910 B1 * 2/2003 Lin

FOREIGN PATENT DOCUMENTS

JP          53-133828       * 11/1978

* cited by examiner

Primary Examiner—Laurie K. Cranmer
(74) Attorney, Agent, or Firm—Brinks Hofer Gilson & Lione

(57) ABSTRACT

A seat device includes a safety bar which is connected to two lateral wing members of a seat body by insertion of two insert plugs into two mounting sockets, respectively. A lever plate is pivoted to each socket and is turnable such that an engaging end thereof engages a concavity in the corresponding plug to place the safety bar in an engaged state. Pressing an opposite actuating end of the lever plate will cause the engaging end to disengage from the concavity so as to permit removal of the plug from the socket.

6 Claims, 4 Drawing Sheets

SEAT DEVICE FOR A STROLLER

CROSS-REFERENCE TO RELATED APPLICATION

This application claims priority of United Kingdom Patent Application No. 0123005.1, filed on Sep. 25, 2001.

BACKGROUND OF THE INVENTION

1. Field of the Invention

This invention relates to a seat device for a stroller, more particularly to a seat device with a safety bar which is connected removably to two lateral wing members provided on a seat body.

2. Description of the Related Art

A conventional stroller generally includes a safety bar with two ends secured on two lateral sides of a seat member for safety purpose. However, the safety bar, which extends across a front end of the seat member, will hinder placement of a child on the seating member.

SUMMARY OF THE INVENTION

The object of the present invention is to provide a seat device in which a safety bar is removably connected to a seat body so as to facilitate placement of a child on the seat body.

According to this invention, the seat device includes a seat body which has two lateral edges that extend in a longitudinal direction and that are spaced apart from each other in a first direction transverse to the longitudinal direction. A safety bar includes an elongate middle portion which extends in the first direction and which has two ends, and two mounting end portions which are respectively disposed on and which bend downwardly from the ends of the middle portion in the second direction towards the lateral edges, respectively, so as to cooperate with the seat body to confine a seating space. Two connecting members are disposed to interconnect the mounting end portions and the lateral edges. Each connecting member includes a mounting socket, an insert plug, a lever plate, and a biasing member. The mounting socket is disposed securely on a respective one of the lateral edges, and has proximate and distal inner wall surfaces which extend upwardly and in the second direction and which are spaced apart from each other in the first direction to confine an insert groove therebetween, and an outer wall surface which is disposed opposite to the distal inner wall surface and which defines a through slot that extends through the distal inner wall surface in the first direction to communicate with the insert groove. The insert plug is disposed on and extends from a respective one of the mounting end portions in the second direction distal to the middle portion of the safety bar, and has proximate and distal insert wall surfaces which are dimensioned such that the insert plug is inserted in the second direction into the insert groove, and a concavity which is formed in the distal insert wall surface and which confronts the through slot when the insert plug is inserted into the insert groove. The lever plate is pivoted to the outer wall surface of the mounting socket about a fulcrum oriented in the longitudinal direction, and has an engaging end extending into the insert groove to engage the concavity so as to restrain removal of the insert plug from the insert groove, and an actuating end which is disposed opposite to the engaging end relative to the fulcrum in the second direction such that pressing the actuating end towards the outer wall surface will cause the engaging end to turn about the fulcrum and to disengage the concavity. The biasing member is disposed to bias the engaging end to move into the insert groove to engage the concavity.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
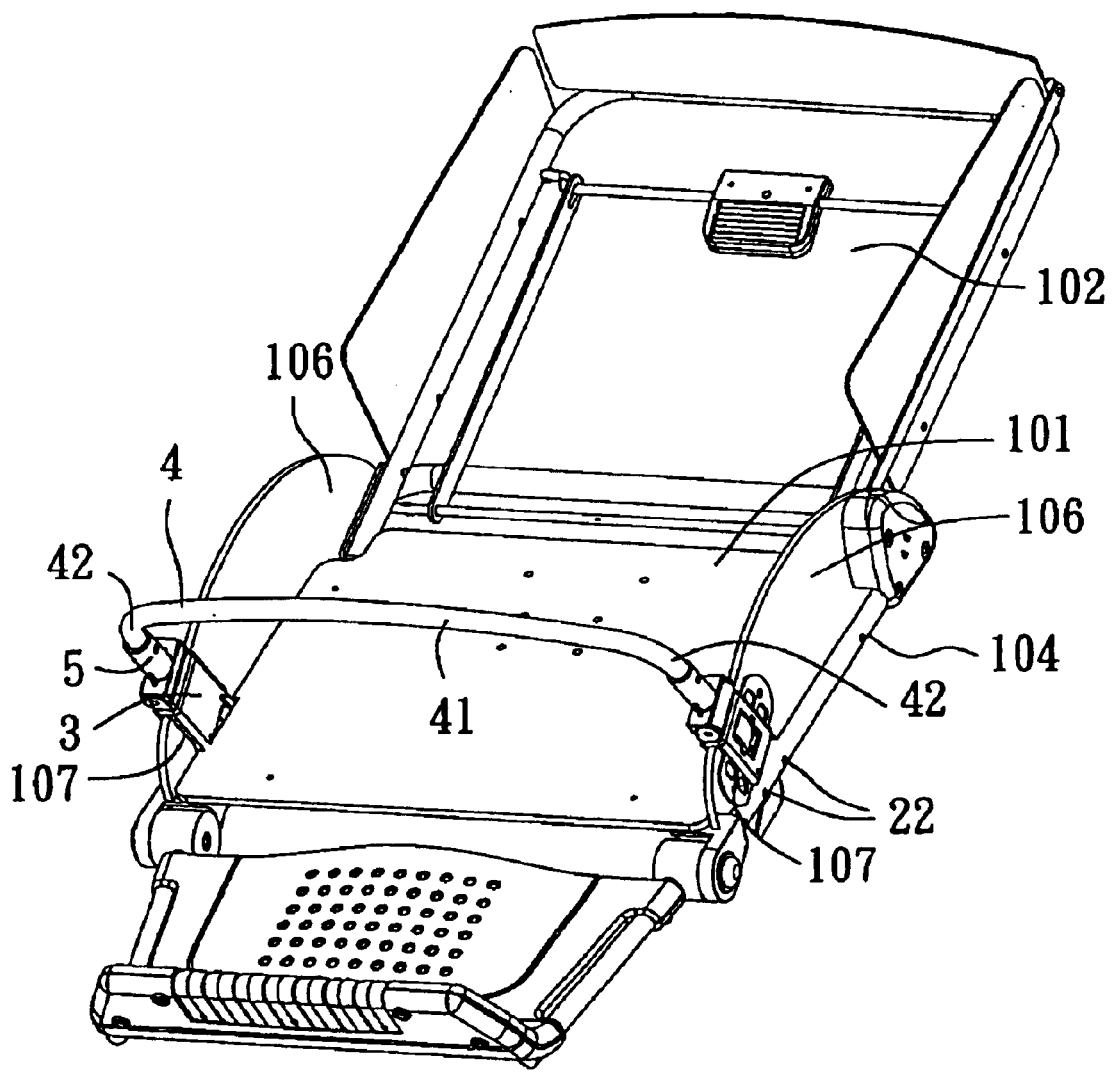
FIG. 1 is a perspective view of the preferred embodiment of a seat device according to this invention.
Figure 2:
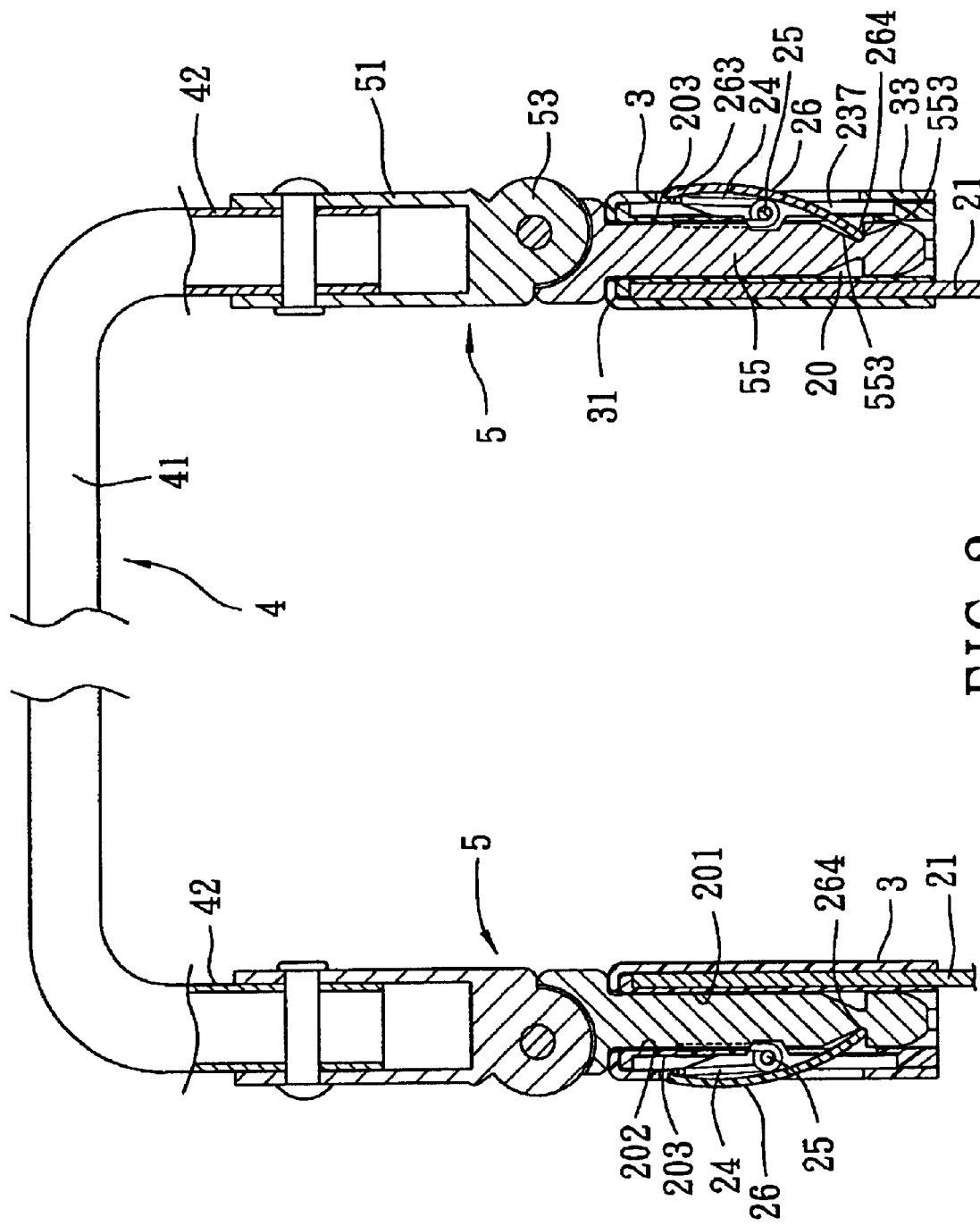
FIG. 2 is a partially sectional schematic view of the preferred embodiment showing a safety bar thereof in an engaged state.
Figure 3:
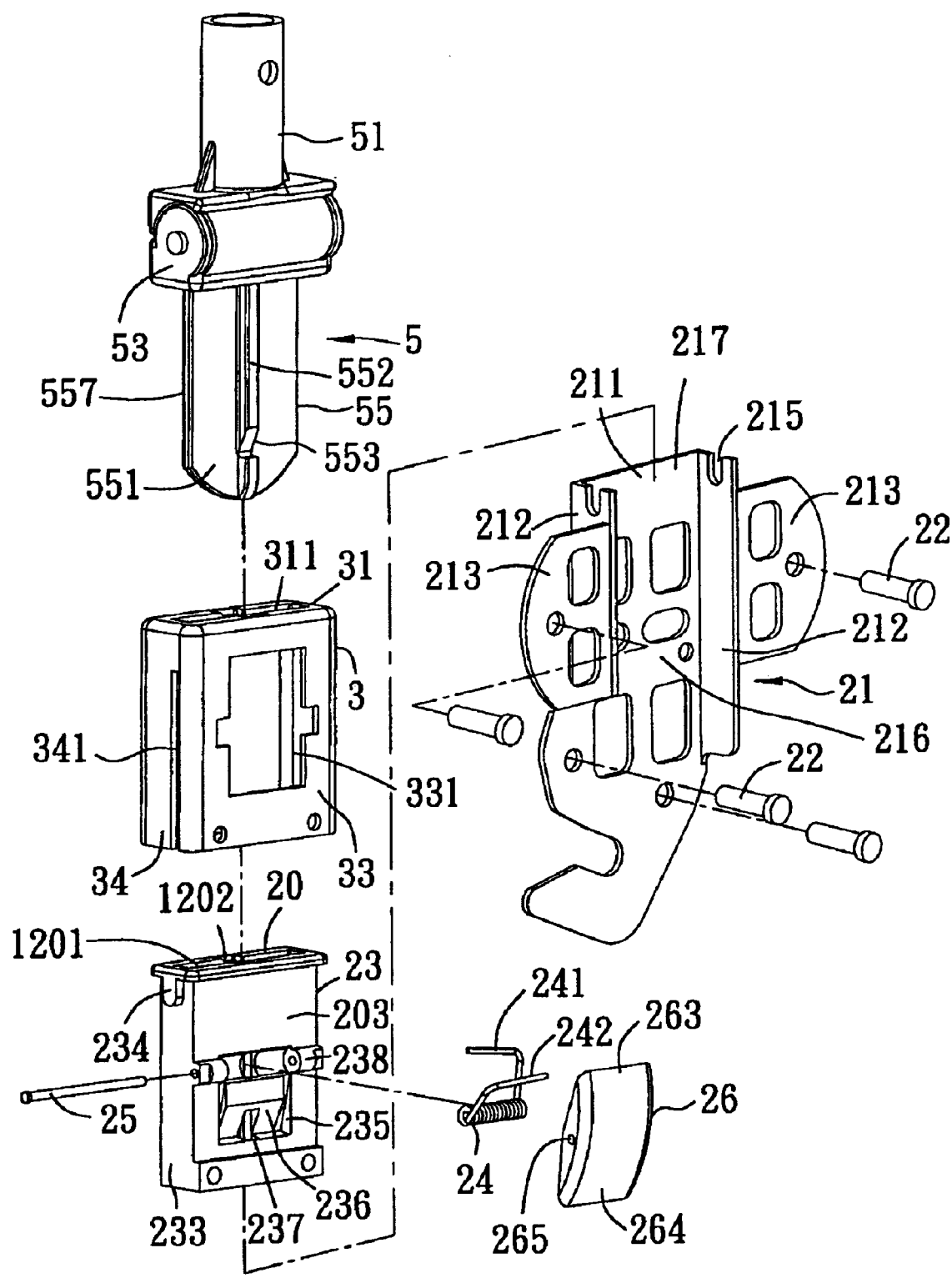
FIG. 3 is an exploded perspective view of a portion of the preferred embodiment.

Referring to FIGS. 1, 2 and 3, the preferred embodiment of a seat device according to the present invention is adapted to be mounted on a stroller (not shown), and is shown to comprise a seat body 101 which is formed integrally with a backrest body 102. The seat body 101 has two lateral edges 104 which extend in a longitudinal direction and which are spaced apart from each other in a first direction transverse to the longitudinal direction. Two lateral wing members 106 are disposed on and respectively extend from the lateral edges 104 upwardly and in a second direction transverse to the longitudinal and first directions. Each of the lateral wing members 106 is formed with a notch 107 which extends downwardly and in the second direction.

A safety bar 4 includes an elongate middle portion 41 which extends in the first direction and which has two ends, and two mounting end portions 42 which are respectively disposed on and which bend downwardly from the ends of the middle portion 41 in the second direction towards the lateral wing members 106, respectively, so as to cooperate with the seat body 101 to confine a seating space.

Two connecting members are disposed to interconnect the mounting end portions 42 and the corresponding lateral wing members 106. Each connecting member includes a positioning frame 21, a mounting socket 23, an insert plug 5, a lever plate 26, a biasing member 24, and a positioning shell 3.

The positioning frame 21 includes an intermediate portion 211 which is inserted into the notch 107 in a respective one of the lateral wing members 106, two lateral portions 212 which extend transversely and respectively from two lateral edges of the intermediate portion 211 to cooperate with the intermediate portion 211 to define a mounting slot 216 with an upper opening end 217 and which have upper engaging recesses 215, respectively, and two lugs 213 which extend respectively from the lateral portions 212 in the longitudinal direction so as to abut against and to be secured on the respective lateral wing member 106 by means of fasteners 22.

The mounting socket 23 has proximate and distal inner wall surfaces 201, 202 which extend upwardly and in the second direction and which are spaced apart from each other in the first direction to confine an insert groove 20 therebetween, and an outer wall surface 203 which is disposed opposite to the distal inner wall surface 202 and which defines a through slot 235 that extends through the distal inner wall surface 202 in the first direction to communicate with the insert groove 20. The insert groove 20 includes an elongated insert portion 1201 and an elongated guiding recess 1202 which is formed transversely of the insert portion 1201. The mounting socket 23 is insertable into the mounting slot 216 in the second direction via the upper opening end 217. Two retaining protrusions 234 are disposed on two side walls 233 to be retained in the upper engaging recesses 215. A protrusion 236 extends outwardly of the through slot 235 and is formed with a communication slot 237 which communicates the insert groove 20 with the through slot 235. A pair of pivot lugs 238 are disposed on the outer wall surface 203 such that a pivot pin 25 is rotatably mounted thereon and extends in the longitudinal direction to define a pivot axis.

The insert plug 5 includes a tubular upper portion 51 which is disposed on and extends from the respective mounting end portion 42 in the second direction, a lower portion 55, and a middle portion 53 which interconnects the upper and lower portions 51,55. The lower portion 55 has proximate and distal insert wall surfaces 557,551 that are insertable in the second direction into the insert portion 1201 of the insert groove 20. A guiding protrusion 552 is disposed on and projects from the distal insert wall surface 551 in the first direction, and extends along the distal insert wall surface 551 so as to slide in the guiding recess 1202 when the insert plug 5 is inserted into the insert groove 20. A concavity 553 is formed in the guiding protrusion 552 to confront the communication slot 237.

Figure 4:
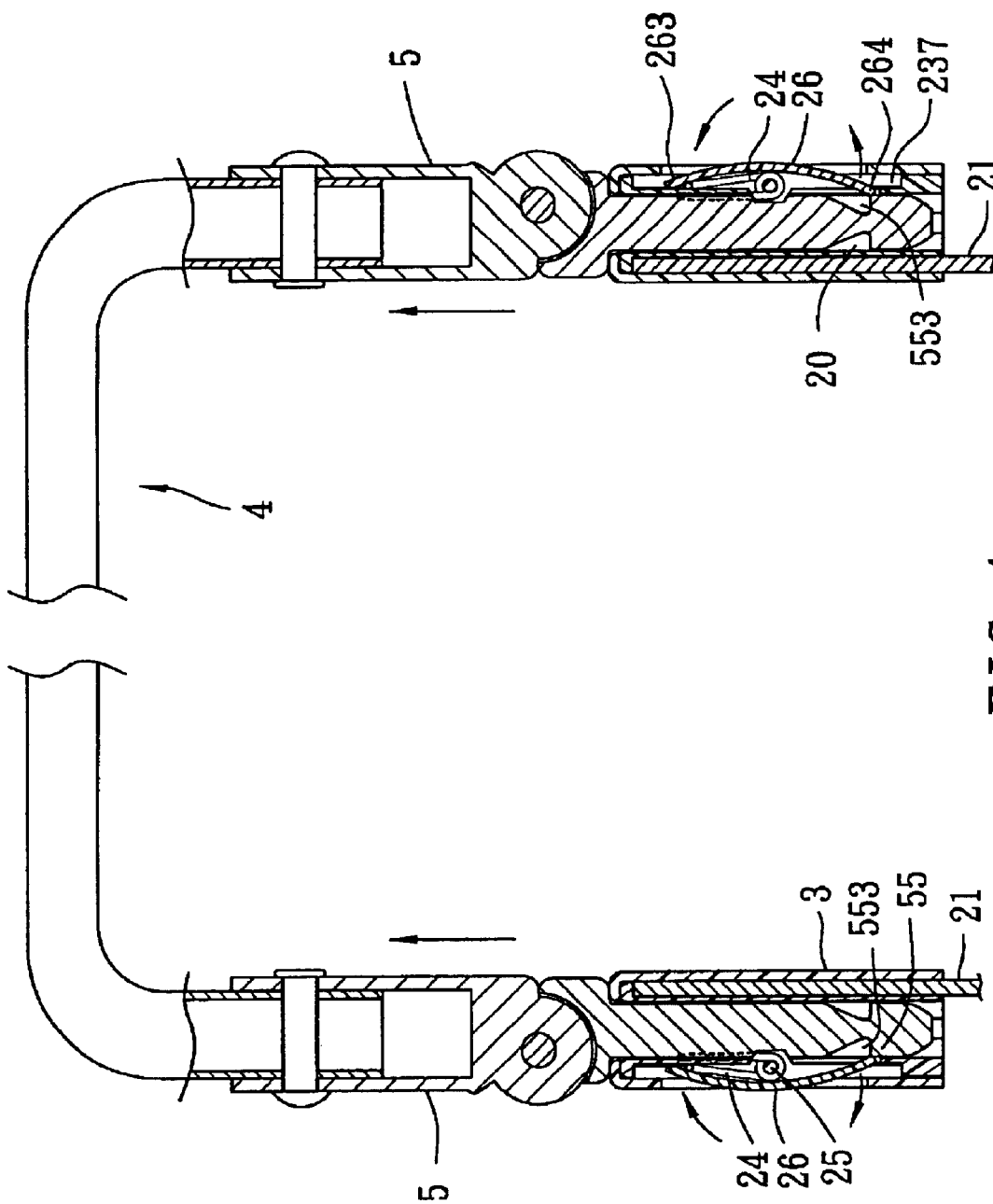
FIG. 4 is a partially sectional schematic view of the preferred embodiment showing the safety bar in a disengaged state.

The lever plate 26 is disposed on the pivot pin 25, with a fulcrum 265 coinciding with the pivot axis, and has an engaging end 264 extending into the insert groove 20 via the through slot 235 to engage the concavity 553 in the guiding protrusion 552 so as to restrain removal of the insert plug 5 from the insert groove 20, and an actuating end 263 which is disposed opposite to the engaging end 264 relative to the fulcrum 265 in the second direction. As such, referring to FIG. 4, pressing the actuating end 263 towards the outer wall surface 203 of the mounting socket 23 will cause the engaging end 264 to turn about the fulcrum 265 and to disengage from the concavity 553. The biasing member 24, such as a torsion spring, is sleeved on the pivot pin 25, and has a first end 241 which abuts against the outer wall surface 203 and a second end 242 which abuts against the actuating end 263 so as to bias the engaging end 264 to move into the insert groove 20 to engage the concavity 553.

The positioning shell 3 has two elongate slits 341 respectively formed in two side walls 34 thereof so as to be sleeved on the intermediate portion 211 of the positioning frame 21 downwardly and in the second direction when the mounting socket 23 has been inserted into the mounting slot 216. An opening 331 is formed in a major wall 33 which confronts the outer wall surface 203 to correspond to the through slot 235. In addition, an upper opening 311 is formed in an upper wall 31 for insertion of the lower portion 55 of the insert plug 5. The positioning shell 3 is fastened onto the positioning frame 21 so as to prevent movement of the mounting socket 23 relative to the mounting slot 216 upwardly and in the second direction. Moreover, the positioning shell 3 can shield the mounting socket 23, the biasing member 24 and the pivot pin 25.

By virtue of the aforesaid construction, the safety bar 4 can be conveniently retained between the lateral wing members 106 with the engaging ends 264 of the lever plates 26 engaging respectively the concavities 553 of the insert plugs 55. Moreover, pressing the actuating ends 263 of the lever plates 26 against the biasing action of the biasing members 24 can disengage the engaging ends 264 from the concavities 553 so as to enable the insert plugs 5 to be removed from the mounting sockets 23, thereby permitting removal of the safety bar 4 from the lateral wing members 104 for facilitating placement of a child on the seat body 101. It is noted that the connecting members of this embodiment have a compact construction so as not to impair the outer appearance of the seat device.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A seat device for a stroller, comprising:

a seat body having two lateral edges extending in a longitudinal direction and spaced apart from each other in a first direction transverse to the longitudinal direction;

a safety bar including an elongate middle portion extending in the first direction and having two ends, and two mounting end portions respectively disposed on and bending downwardly from said ends of said middle portion in a second direction transverse to the longitudinal and first directions towards said lateral edges respectively so as to cooperate with said seat body to confine a seating space; and two connecting members, each disposed to interconnect one of said mounting end portions and a respective one of said lateral edges, each of said connecting members including a mounting socket disposed securely relative to a respective one of said lateral edges, and having proximate and distal inner wall surfaces which extend upwardly and in the second direction and which are spaced apart from each other in the first direction to confine an insert groove therebetween, and an outer wall surface which is disposed opposite to said distal inner wall surface and which defines a through slot that extends through said distal inner wall surface in the first direction to communicate with said insert groove, an insert plug disposed on and extending from a respective one of said mounting end portions in the second direction distal to said middle portion, and having proximate and distal insert wall surfaces which are dimensioned such that said insert plug is insertable in the second direction into said insert groove, and a concavity which is formed in a guiding protrusion projecting from said distal insert wall surface and which confronts said through slot when said insert plug is inserted into said insert groove, a lever plate pivoted to said outer wall surface about a fulcrum oriented in the longitudinal direction, and having an engaging end extending into said insert groove to engage said concavity so as to restrain removal of said insert plug from said insert groove, and an actuating end which is disposed opposite to said engaging end relative to said fulcrum in the second direction such that pressing said actuating end towards said outer wall surface will cause said engaging end to turn about the fulcrum and to disengage said concavity, and a biasing member disposed to bias said engaging end to move into said insert groove to engage said concavity.

2. The seat device of claim 1, wherein said mounting socket of each of said connecting members further has an elongated guiding recess formed in said distal inner wall surface and elongated in the second direction, and wherein said guiding protrusion projects from said distal insert wall surface in the first direction and extends along said distal insert wall surface in the second direction so as to slide in said guiding recess when said insert plug is inserted into said insert groove.

3. The seat device of claim 1, wherein each of said connecting members further includes a pivot pin rotatably mounted on said outer wall surface and extending in the longitudinal direction to define a pivot axis, said lever plate being disposed on said pivot pin such that said fulcrum coincides with said pivot axis, said biasing member being a torsion spring which is sleeved on said pivot pin and which has a first end that abuts against said outer wall surface, and a second end that abuts against said actuating end so as to bias said engaging end to move into said insert groove.

4. The seat device of claim 1, further comprising two lateral wing members disposed on and respectively extending from said lateral edges upwardly and in the second direction, said mounting socket of each of said connecting members being disposed securely on a respective one of said lateral wing members.

5. The seat device of claim 4, further comprising two positioning frames, each including two lugs which are locked onto a respective one of said lateral wing members in the first direction, and an intermediate portion which is disposed between said lugs and which defines a mounting slot that extends in the second direction and that has an upper opening end for insertion of said mounting socket downwardly and in the second direction.

6. The seat device of claim 5, further comprising two positioning shells, each of which is disposed to sleeve on said intermediate portion of a respective one of said positioning frames downwardly and in the second direction when said mounting socket has been inserted into said mounting slot, and which is fastened relative to the respective one of said positioning frames so as to prevent movement of said mounting socket relative to said mounting slot upwardly and in the second direction.

* * * * *